(12) United States Patent
Vladimerou et al.

(10) Patent No.: US 9,830,517 B2
(45) Date of Patent: Nov. 28, 2017

(54) ROAD BRANCH DETECTION AND PATH SELECTION FOR LANE CENTERING

(71) Applicant: Toyota Motor Engineering & Manufacturing North America, Inc., Erlanger, KY (US)

(72) Inventors: Vladimeros Vladimerou, Ypsilanti, MI (US); Rohit Pandita, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 745 days.

(21) Appl. No.: 14/308,818

(22) Filed: Jun. 19, 2014

(65) Prior Publication Data

US 2015/0367778 A1 Dec. 24, 2015

(51) Int. Cl.
*G06K 7/00* (2006.01)
*G06K 9/00* (2006.01)

(52) U.S. Cl.
CPC .................. *G06K 9/00798* (2013.01)

(58) Field of Classification Search
USPC ........................................................ 348/148
See application file for complete search history.

(56) References Cited

U.S. PATENT DOCUMENTS

| 6,385,536 | B2 | 5/2002 | Kimura |
| 8,112,222 | B2 | 2/2012 | Nakao et al. |
| 8,346,427 | B2 | 1/2013 | Kobayashi |
| 8,410,919 | B2 | 4/2013 | Kataoka |
| 2005/0004753 | A1 | 1/2005 | Weiland |
| 2008/0061952 | A1* | 3/2008 | Maass .................... B60Q 9/008 340/435 |
| 2008/0189012 | A1 | 8/2008 | Kaufmann |
| 2008/0291276 | A1* | 11/2008 | Randler .................. B62D 1/28 348/149 |
| 2011/0022317 | A1* | 1/2011 | Okita .................... B60W 30/12 701/301 |
| 2012/0095682 | A1 | 4/2012 | Wilson |
| 2012/0150437 | A1 | 6/2012 | Zeng et al. |
| 2014/0012501 | A1 | 1/2014 | Hahne |

(Continued)

FOREIGN PATENT DOCUMENTS

| JP | 201019628 A | 1/2010 |
| JP | 201133572 A | 2/2011 |

OTHER PUBLICATIONS

International Search Report and Written Opinion with Search History dated Aug. 7, 2015 in PCT/US 15/32611.

*Primary Examiner* — Kevin McInnish
(74) *Attorney, Agent, or Firm* — Oblon, McClelland, Maier & Neustadt, L.L.P.

(57) ABSTRACT

Lane feature data is processed to compute a feed-forward lane curvature of a left lane boundary and a right lane boundary. A look-ahead lane width and a near lane width are computed based on left and right lane boundaries. A lane width increase is computed to detect a lane split or lane merge based on differences between increasing lane widths. A side of the vehicle on which the lane split or merge occurred is identified or determined. The lane boundary on the side on which the lane split or merged occurred is ignored, and a single-sided lane centering calculation is performed based on the non-ignored lane boundary.

20 Claims, 7 Drawing Sheets

(56) References Cited

U.S. PATENT DOCUMENTS

2014/0032108 A1* 1/2014 Zeng ..................... B60W 30/12
701/533
2014/0336844 A1* 11/2014 Schwindt .......... B60W 50/0097
701/1

* cited by examiner

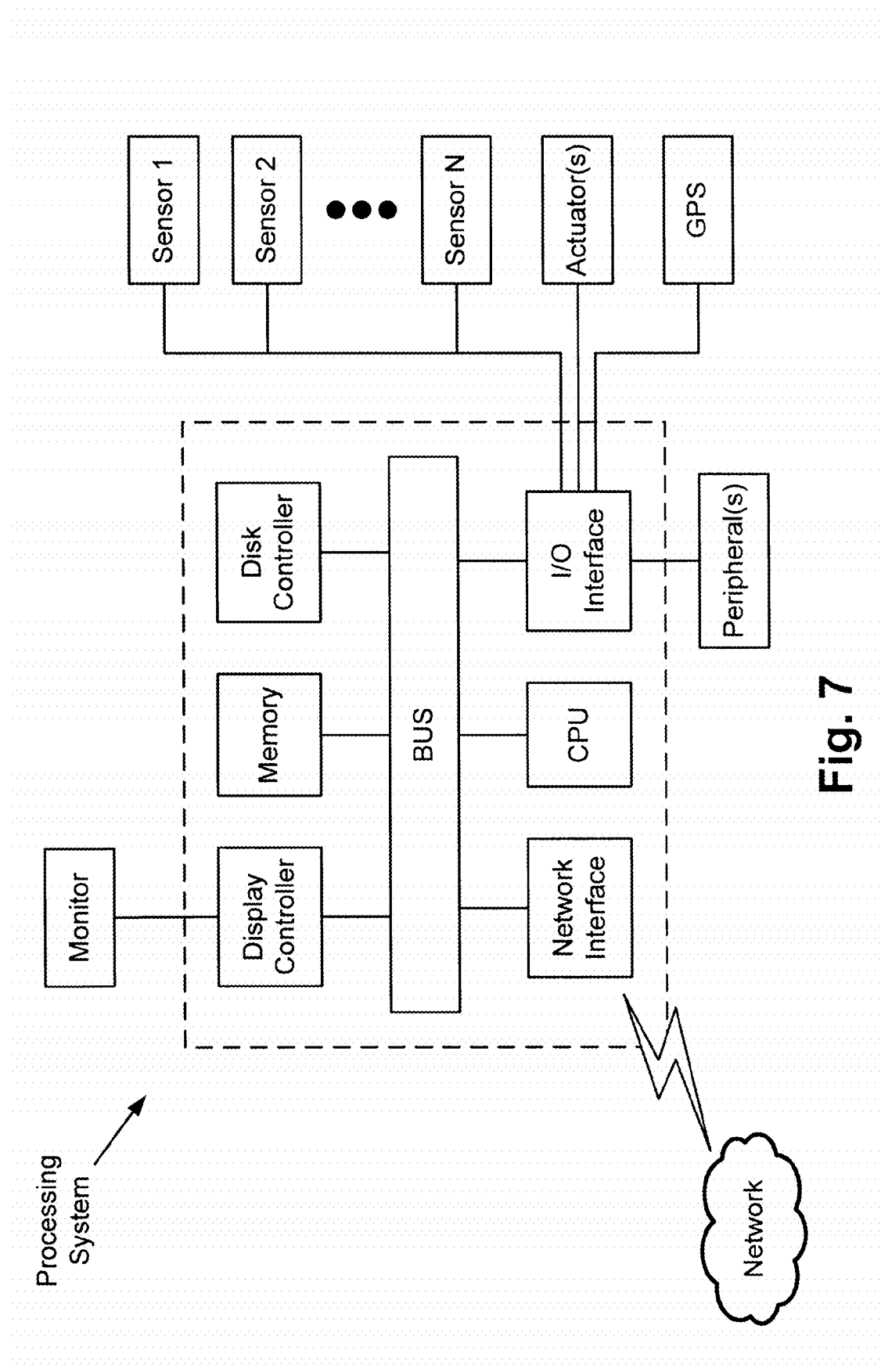

ROAD BRANCH DETECTION AND PATH SELECTION FOR LANE CENTERING

BACKGROUND

Lane splits, off-ramps, lane merges, and on-ramps can be detected with lane feature data from images obtained by vehicle-mounted cameras to improve vehicle lane tracking. U.S. Patent Application Publication No. US/2014/0032108 A1 entitled "Anchor Lane Selection Method Using Navigation Input in Road Change Scenarios" by Zeng et al. describes a method for selecting an anchor lane for a vehicle by combining left and right lane boundary information with digital map data and leading vehicle trajectory data to calculate lane curvature.

SUMMARY

Lane feature data can be processed to compute left and right lane clothoids, and a look-ahead lane width and a near lane width can be computed based on the left and right lane clothoids. A lane width increase can be computed to detect a lane split or lane merge based on differences between the look-ahead and near lane widths. A determination can be made as to which side of a vehicle the lane split or the lane merge occurred, and a single-sided lane centering calculation can be performed based on the left clothoid or the right clothoid corresponding to the side of the vehicle on which the lane split or the lane merge did not occur.

Lane feature data can be obtained from at least one image taken from one or more vehicle-mounted cameras.

The lane split can be determined to be detected when the lane width increase is greater than a first threshold. A determination can be made that the near lane width is the lane width at the vehicle's proximate location. A determination can be made that the look-ahead lane with is the lane width further ahead of the vehicle than the near lane width. An instantaneous offset jump can be computed to detect the lane merge based on differences between the left or right clothoid stored in memory and the current left or right clothoid. A determination that the lane merge is detected can be made if the instantaneous offset jump is greater than a second threshold and no lane split is detected. A verification of the lane split or the lane merge can be performed with stored map data. The left or right clothoid on the side of the vehicle where the lane split or merge occurred can be ignored. A vehicle offset from the side of the vehicle opposite the side where the lane split or lane merge occurred can be calculated. Single-sided lane centering calculation can be performed for a predetermined number of consecutive samples after the lane split or the lane merge is detected. The single-sided lane centering calculation can be performed until the vehicle has traveled a predetermined distance.

The side on which the lane split or the lane merge occurred can be determined based on whether the vehicle is traveling in a "leftmost" lane, a "rightmost" lane, or an "other" lane.

The lane feature data can include lane marker information from the left and right sides of the vehicle. The lane marker information includes one or more of position, curvature, curvature derivative, shape, color, and type of lane markers, and the left and right clothoids can be computed based on the lane marker information. The left and right clothoids that delineate one or more of the position, curvature, curvature derivative, and direction of left and right boundaries of the lane in which the vehicle is traveling can be computed.

A current position of the vehicle can be obtained and correlated with stored map data. The lane splits and the lane merges can be detected based on the stored map data when the current position of the vehicle is determined to be accurate within a predetermined tolerance.

A process can include: processing lane feature data to compute left and right lane clothoids; computing a look-ahead lane width and a near lane width based on the left and right lane clothoids; computing a lane width increase to detect a lane split or lane merge based on differences between the look-ahead and near lane widths; determining on which side of a vehicle the lane split or the lane merge occurred; and performing a single-sided lane centering calculation based on the left clothoid or the right clothoid corresponding to the side of the vehicle on which the lane split or lane merge did not occur.

A non-transitory computer-readable storage medium including executable instructions, which when executed by circuitry, can cause circuitry to perform the process.

A system can include: one or more sensors to obtain lane feature data; and a controller including a processor. The processor can: process the lane feature data to compute left and right lane clothoids; compute a look-ahead lane width and a near lane width based on the left and right lane clothoids; compute a lane width increase to detect a lane split or lane merge based on differences between the look-ahead and near lane widths; determine on which side of a vehicle the lane split or the lane merge occurred; perform a single-sided lane centering calculation based on the left clothoid or the right clothoid corresponding to the side of the vehicle on which the lane split or the lane merge did not occur; and center the vehicle in a lane by transmitting control signals to one or more actuators of the vehicle.

The system can be a part of vehicle system or a vehicle sub-system, and can be removable from the vehicle as a detachable module.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 7 schematically illustrates a processing system for a controller and/or a computer system.

DETAILED DESCRIPTION

Figure 1:
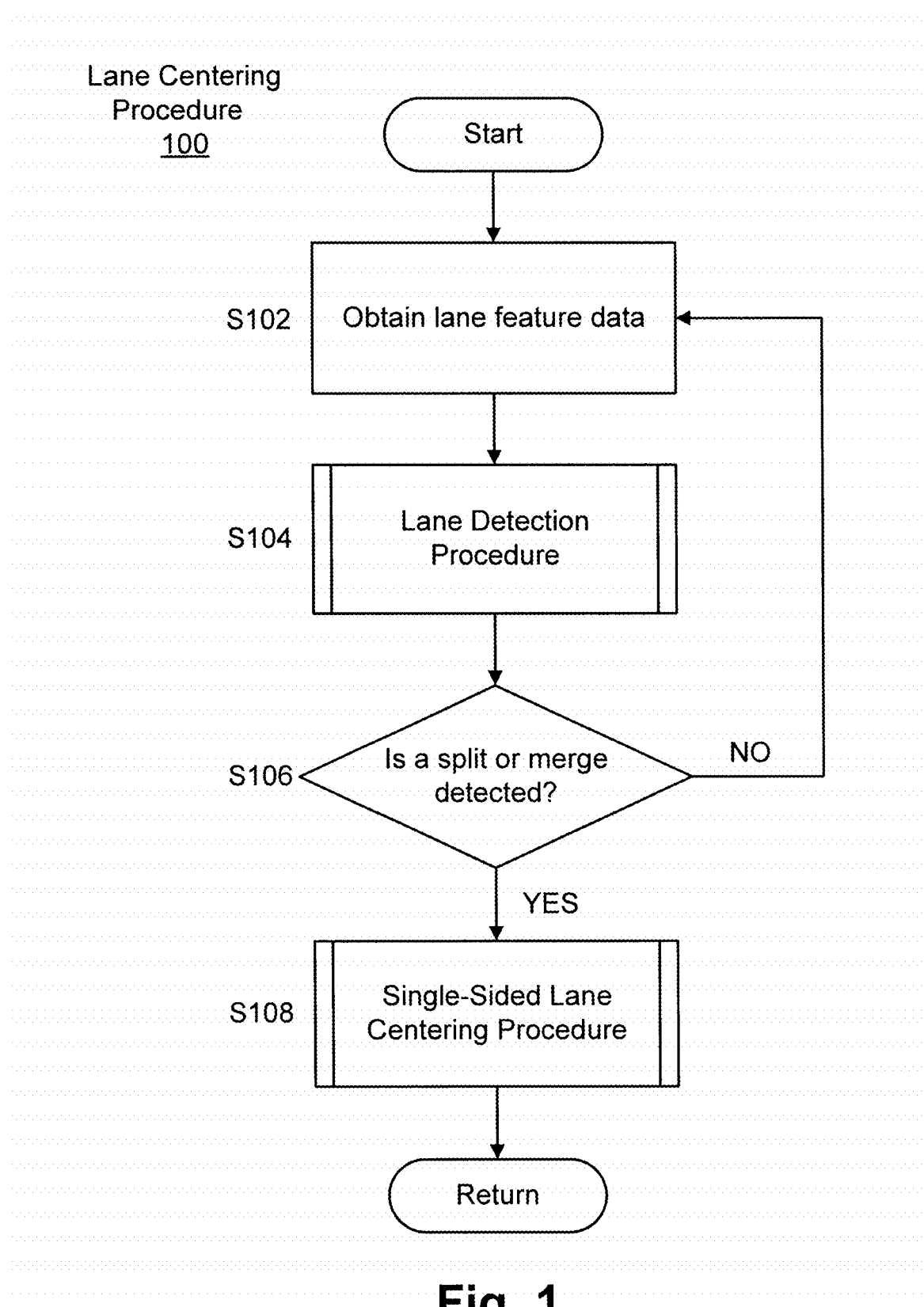
FIG. 1 illustrates a lane centering procedure of an algorithm.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "proximate," and similar terms generally refer to ranges that include the identified value within a margin of 20%, 10%, or preferably 5%, and any values therebetween.

This disclosure relates to centering a vehicle in its lane of travel in the presence of lane splits, off-ramps, lane merges, and on-ramps. For the remainder of the description, the phrase "lane split" is meant to refer to both a lane split and an off-ramp, and the phrase "lane merge" is meant to refer to both a lane merge and an on-ramp. These terms are not meant to limit the scope of this disclosure, but are used to merely provide a more concise description.

A lane centering procedure 100 is illustrated by FIG. 1. Lane feature data is obtained at S102. In this step, the images of left and right lane markers are obtained by at least one vehicle-mounted camera. At S104, a lane detection procedure is executed. A position fix for the vehicle's present location is obtained via GPS or other positioning system and compared to stored map data to find the vehicle's position on a road relative to the map. The stored map data contains information regarding highways and roads, which may include locations of lane splits and lane merges, a number of lanes on a road, types of lane markers on the surface of a road, and the like. If, for example, the vehicle's position is accurate within a predetermined tolerance, which may be 0.1 m (meters), 0.2 m, 0.5 m, 1 m, 3 m or any distance therebetween, and/or the stored map data has been updated to the current year, then the vehicle's position relative to the stored map data can be used to detect the presence of lane splits and lane merges. If the vehicle's position accuracy is not within the predetermined tolerance and/or the stored map data is not updated to the current year, then the lane detection procedure S104 continues as described below with reference to FIG. 2.

At S106, a determination is made of whether a lane split or lane merge has occurred. If the determination results in a "yes," where a lane split or a lane merge has occurred, then a single-sided lane centering procedure S108 is executed. Further exemplary details of the single-sided lane centering procedure S108 are described below with reference to FIG. 3.

Otherwise, if the determination is made at S106 that no lane split or lane merge has been detected, then the procedure returns to step S102 to obtain lane feature data.

Figure 2:
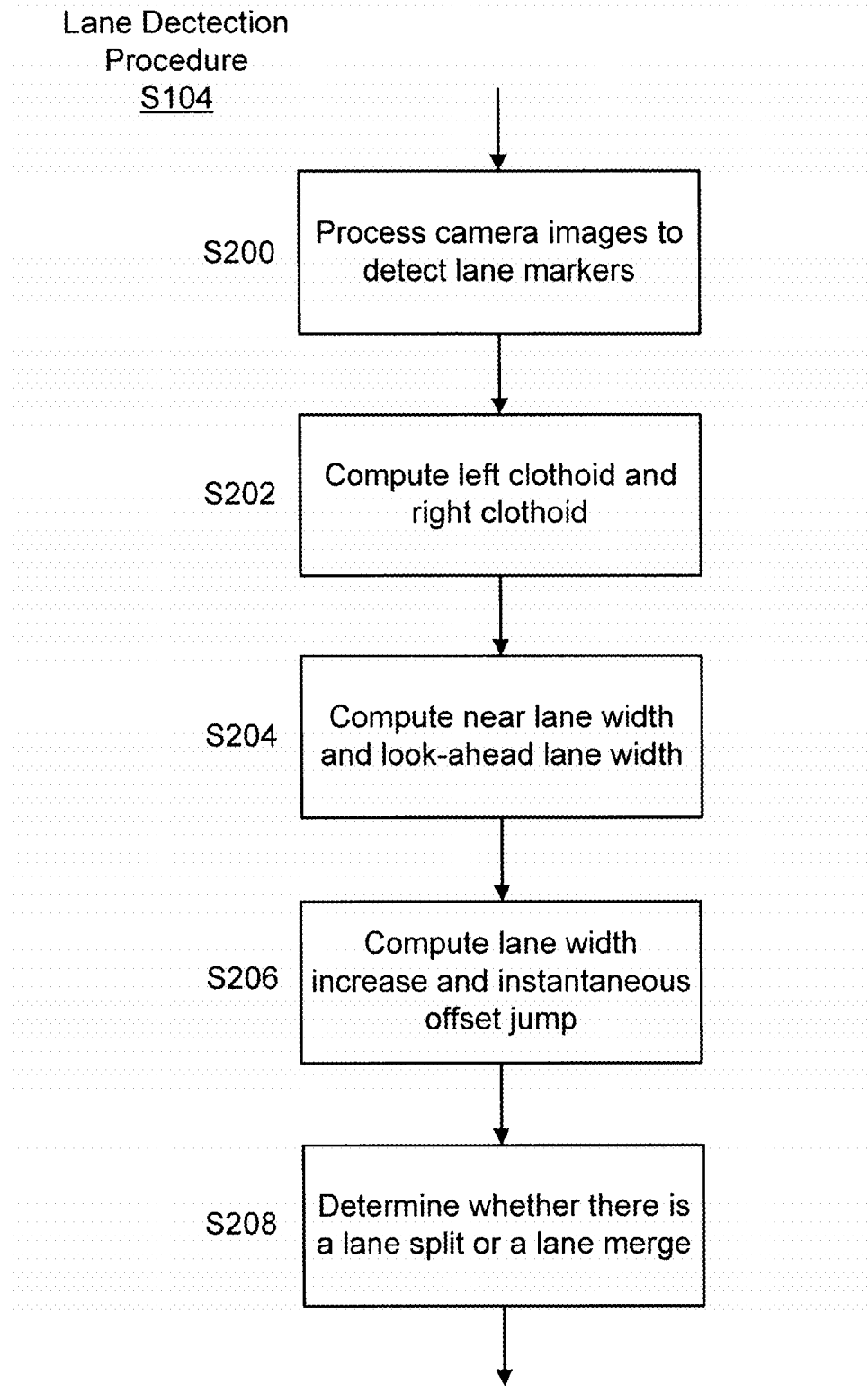
FIG. 2 illustrates a lane detection procedure of an algorithm.

FIG. 2 illustrates further details of the lane detection procedure S104. At S200, images from the vehicle-mounted camera are processed to detect lane markers on the left and right sides of the vehicle. The camera may be mounted on the vehicle so as to obtain images of the surface of the road in front of the vehicle. According to some implementations, more than one camera may be mounted on the vehicle to obtain images of the surface of the road on which the vehicle is traveling. Depending on the user's desired configuration, a camera may also be mounted on the vehicle so that it is positioned to obtain images of the surface of the road behind the vehicle.

The frequency with which images are obtained from the vehicle-mounted camera may be at any rate configured by the user but may vary depending on the speed of the vehicle, accuracy of the lane feature data, and capabilities of the camera and processing circuitry. According to an implementation, image samples from the vehicle-mounted camera are obtained every 100 ms (milliseconds).

In this disclosure, a "lane marker" is a target for partitioning lanes, and in addition to a white or yellow line or the like which is continuously drawn in a form of a line on the surface of a road, a white or yellow broken line which is formed to be a line by intermittently allocating broken lines at predetermined regular or irregular intervals and connecting the broken lines which are mutually neighboring, Botts' dots (points or dots on a surface of a road, each having a diameter of approximately 10 centimeters), a cat's-eyes (reflecting plate on a surface of a road), and the like are included.

At S202, a processor, which includes processing circuitry, computes a left clothoid and a right clothoid for the lane in which the vehicle is traveling, which correspond to the left and right lane boundaries. The processor receives lane marker data, which may include position, curvature, curvature derivative, shape, color, and type of lane markers in order to compute the left and right clothoids. These clothoids delineate the position, curvature, curvature derivative, and direction of the left and right boundaries of the lane in which the vehicle is traveling extending for a distance from the vehicle's proximate location to a predetermined distance ahead of the vehicle. This predetermined distance ahead of the vehicle that the clothoid calculation encompasses varies according to the viewable range of the camera and position of obstructions on the road.

The frequency with which left and right clothoids are computed by the processing circuitry may be at any rate configured by the user but may vary depending on the speed of the vehicle, accuracy of the lane feature data, and capabilities of the processing circuitry. In one aspect, left and right clothoids are computed at the same rate that camera images are obtained, which may be every 100 ms. Once the left and right clothoids are computed, these clothoids may be used to calculate lane widths and may also be stored in memory.

At S204, a near lane width and a look-ahead lane width are computed for the lane in which the vehicle is traveling. These widths are computed by calculating the lateral distance between the left clothoid and the right clothoid at distances relative to the vehicle. The near lane width is computed as the lateral distance between the left and right clothoids at the vehicle's proximate position in a lane. The look-ahead lane width is computed as the lateral distance between the left and right clothoids at a distance further in front of the vehicle than the near lane width. The distance ahead of the vehicle at which the look-ahead lane width is computed may be any distance acceptable to detect a change in lane width within the range of 0.5 m to 100 m and also including 0.5, 1 m, 5 m, 10 m, 25 m, 50 m, 75 m, 100 m, or more depending on the vehicle's speed, clothoid parameter accuracy, and type of controller implementation.

At S206, the processing circuitry computes a lane width increase, which is a difference between the near lane width and the look-ahead lane width. In addition, an instantaneous offset jump is computed by calculating the difference in lateral position between the current left and right clothoids and previous left and right clothoids stored in memory. Specifically, the instantaneous offset jump computed for the right side of the vehicle includes calculating the difference between the most recently computed right clothoid and a right clothoid stored in memory. The right clothoid stored in memory that is selected for the instantaneous offset jump calculation may vary depending on the vehicle's speed, clothoid parameter accuracy, and capabilities of the processing circuitry. The clothoid retrieved from memory, which is selected for the instantaneous offset jump calculation, had been calculated for the vehicle's location in the past (i.e., for a time corresponding to when the vehicle was a distance back from its current position) within a range of 0.5 m to 100 m back from the vehicle's current location. A specific distance can be selected by a user or service technician, and can be set to 0.5, 1 m, 5 m, 10 m, 25 m, 50 m, 75 m, 100 m, or any distance therebetween.

At S208, a determination is made as to whether a lane split or a lane merge is detected. If the computed lane width increase of S206 is greater than a first predetermined threshold, a lane split is detected. Predetermined thresholds for a lane width increase at S206 indicative of a lane split may be bounded from below by an appropriate percentage of the lane width, which may be 20%, or bounded from below by an absolute value, which may be 50 cm depending on vehicle speed, clothoid parameter accuracy, and type of controller implementation.

If the computed instantaneous offset jump of S206 is greater than a second predetermined threshold, then a lane merge is detected. Predetermined thresholds for an instantaneous offset jump at S206 indicative of a lane merge may be bounded from below by an appropriate percentage of the lane width, which may be 20%, or bounded from below by an absolute value, which may be 50 cm depending on vehicle speed, clothoid parameter accuracy, and type of controller implementation.

Figure 3:
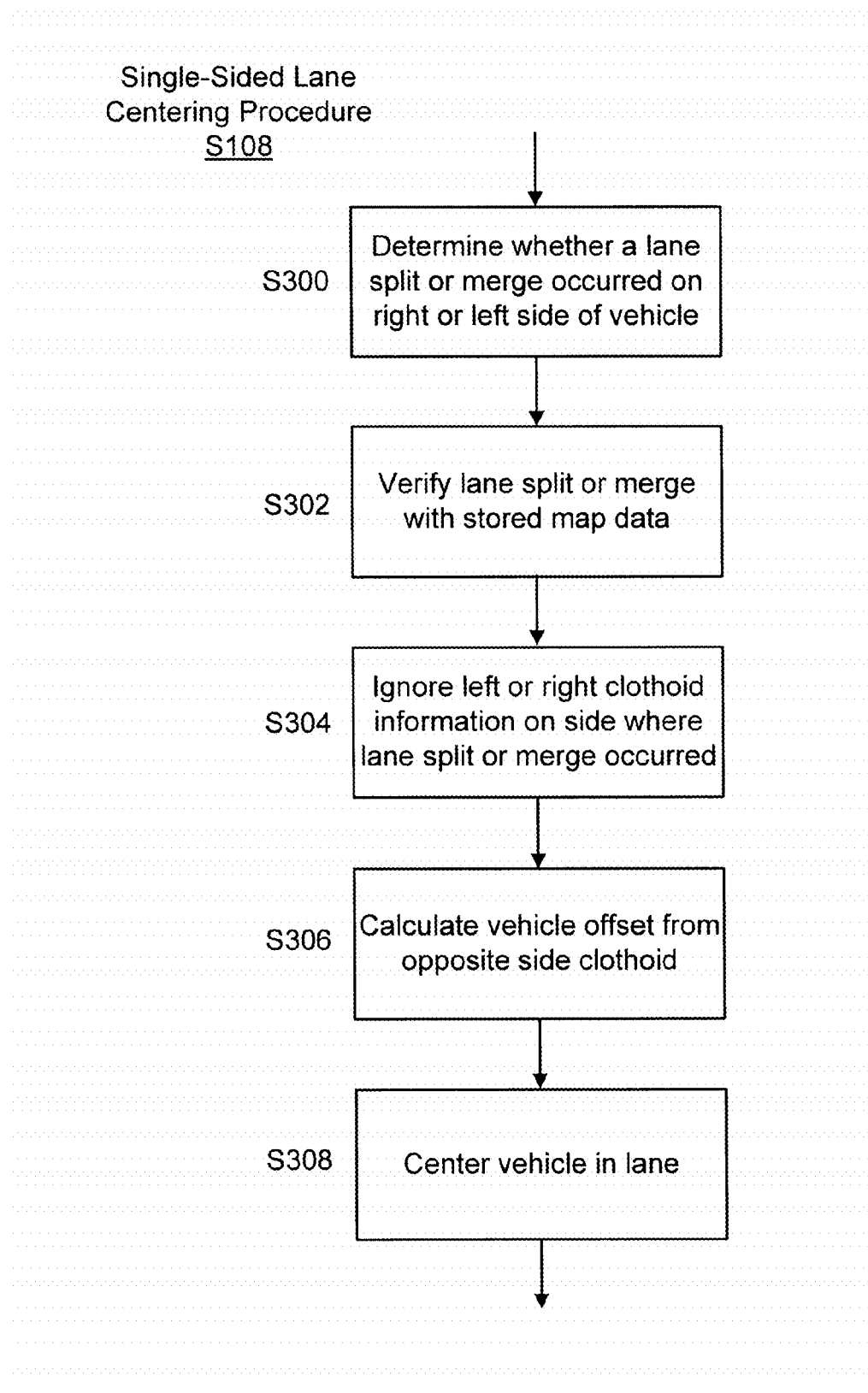
FIG. 3 illustrates a single-sided lane centering procedure of an algorithm.

FIG. 3 illustrates further details of single-sided lane centering procedure S108. At S300, processing circuitry determines whether the lane split or lane merge occurred on the left side or the right side of the vehicle. The side of the vehicle on which a lane split occurs is determined to be the side of the vehicle whose detected lane markers are solid lines, and the detected lane markers on the side opposite the lane split are dashed lines. The side of the vehicle on which a lane merge occurs is determined by the clothoid that experienced the instantaneous offset jump. For example, if the right clothoid experiences an instantaneous offset jump that exceeds the predetermined threshold, then the lane merge occurred on the right side of the right side of the vehicle.

According to an implementation, the lane in which the vehicle is traveling is used to determine on which side the lane split or lane merge occurred. In this implementation, for a road including multiple travel lanes, the current lane in which the vehicle travels may be identified as "leftmost," "rightmost," or "other." If a lane split or lane merge is detected while the vehicle is traveling in the "leftmost" lane, then the lane split or lane merge is determined to have occurred on the left side of the vehicle. If a lane split or lane merge is detected while the vehicle is traveling in the "rightmost" lane, then the lane split or lane merge is determined to have occurred on the right side of the vehicle. If the vehicle is traveling in a lane that is classified as "other," then the determination of the side of the vehicle on which the lane split or lane merge occurred defaults to the right side of the vehicle.

At S302, the processing circuitry makes a verification of the lane split or lane merge with the stored map data. A positioning system such as GPS may be used to find the vehicle's relative position on a stored map that contains feature data such as road features that include lane split locations, lane merge locations, and the like to verify that the computed lane split or lane merge is correct. At S304, the processing circuitry ignores the right or left clothoid for the side of the vehicle on which the lane split or lane merge is detected. For example, if a lane split is detected on the right side of the vehicle, then the processor disregards the right clothoid.

At S306, the processing circuitry calculates a vehicle offset from the non-ignored clothoid. Specifically, the non-ignored clothoid is the clothoid on the side of the vehicle opposite the side of the vehicle where the lane split or lane merge occurred. In the example where there is a lane split on the right side of the vehicle, the vehicle offset is based on the left clothoid. In this example, the vehicle offset is determined by calculating half an average lane width's lateral distance from the left clothoid. An average lane width's distance may be computed online as a running average of previously identified lane widths or taken from offline information, such as a map or statistics. The average lane width can also be adjusted by a user or technician for calibration purposes to adjust computations to suit specific localities.

At S308, the vehicle is centered in the correct lane, which may include maintaining the vehicle's current course and speed or making adjustments to the vehicle's course and/or speed to center the vehicle in its current lane or steer the vehicle toward the center of an intended lane. Processing circuitry sends control signals to one or more vehicular actuators to make adjustments to the one or more actuated components, which may include steering, brake, accelerator, and throttle controllers of a vehicle, which can be wired to mechanical actuators to steer a steering wheel, depress/release a throttle pedal, and depress/release a brake pedal. Electronic drive-by-wire controllers can also be utilized. The controllers can be implemented by one or more electronic control units (ECUs). In an exemplary usage, if the vehicle has been determined to have veered to the right, away from the center of its lane, then the processing circuitry can send a control signal to the steering actuator to adjust steering to the left to center or re-center the vehicle in the lane, and the opposite functions can also be provided when the vehicle has been determined to have veered to the left. Further, such steering corrections to center the vehicle in the correct lane can be combined with changing a speed of the vehicle based on a road speed limit or detected vehicles. Specifically, the speed of the vehicle can be adjusted to perform collision avoidance algorithms and/or to maintain a predetermined distance between vehicles.

Figure 4:
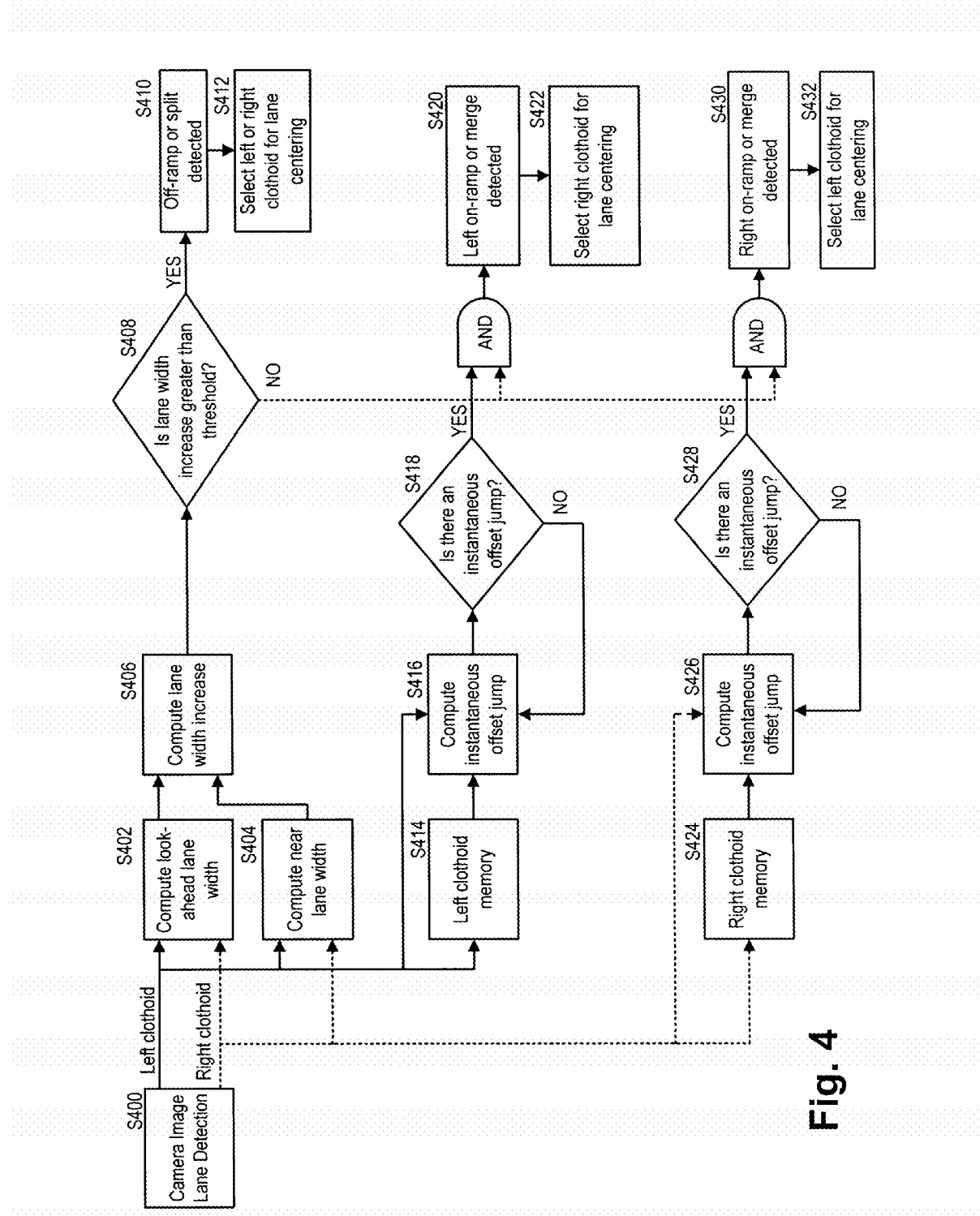
FIG. 4 illustrates an algorithm.

FIG. 4 illustrates an algorithm for performing a single-sided lane centering procedure. At S400, a processor, which includes processing circuitry, performs a lane detection procedure on images obtained from at least one vehicle-mounted camera and outputs a left clothoid and a right clothoid corresponding to the left and right lane boundaries. The circuitry receives lane marker data, which may include position, curvature, curvature derivative, shape, color, and type of lane markers in order to compute the left and right clothoids. These clothoids delineate the position, curvature, curvature derivative, and direction of the left and right boundaries of the lane in which the vehicle is traveling extending for a distance from the vehicle's proximate location to a predetermined distance ahead of the vehicle. This predetermined distance ahead of the vehicle that the clothoid calculation encompasses may vary depending on the vehicle's speed, clothoid parameter accuracy, and capabilities of the processing circuitry, but can be within a range of 0.5 m to 100 m and include 0.5 m, 1 m, 5 m, 10 m, 25 m, 50 m, 75 m, 100 m, or more.

At S404, a near lane width is computed. This width is computed by calculating the lateral distance between the left and right clothoids at the vehicle's proximate position in a lane. At S402, a look-ahead lane width is computed. This width is calculated by computing the lateral distance between the left and right clothoids at a distance further in front of the vehicle than the near lane width. The distance ahead of the vehicle at which the look-ahead lane width is computed may be any distance acceptable to detect a change in lane width within a range of 0.5 m to 100 m and include 0.5 m, 1 m, 5 m, 10 m, 25 m, 50 m, 75 m, 100 m, or more.

At S406, the processor computes a lane width increase which is a difference between the near lane width and the look-ahead lane width. At S408, the lane width increase is compared to a predetermined threshold. If the lane width increase is greater than the threshold, resulting in a "yes," then at S410 it is determined that a lane split has been detected. Predetermined thresholds for a lane width increase at S408 indicative of a lane split may be may be bounded from below by an appropriate percentage of the lane width, which may be 20%, or bounded from below by an absolute value, which may be 50 cm (centimeters) depending on vehicle speed, clothoid parameter accuracy, and type of controller implementation.

Otherwise, if the comparison to the predetermined threshold is not satisfied at S408, resulting in a "no," then a lane split is not detected.

Once it has been determined that a lane split has been detected at S410, at S412, the processor selects the left or right clothoid for lane centering. The clothoid that is selected is on the side of the vehicle opposite the side on which the lane split occurred. In an example where there is a lane split on the right side of the vehicle, the vehicle is centered in the lane by calculating a lateral offset from the left clothoid. The lateral offset may be calculated as half an average lane width's distance. An average lane width's distance may be computed online as a running average of previously identified lane widths or taken from offline information, such as a map or statistics.

At S414, the left clothoid is stored in memory so that it can be input in the future to calculate an instantaneous offset jump at S416. At S416, the instantaneous offset jump is computed by calculating a difference in lateral position between the current left clothoid at the vehicle's proximate position and a previous left clothoid stored in memory. Specifically, a clothoid stored in memory that is used for the instantaneous offset jump calculation may be configured by the user based on vehicle speed, clothoid parameter accuracy, and processing circuitry capabilities based on, e.g., a prior position of the vehicle. According to one aspect, the clothoid retrieved from memory, which is selected for the instantaneous offset jump calculation, had been calculated for the vehicle's location 25 m in the past (i.e., at a time corresponding to when the vehicle was 25 m back from its current position). Alternatively, a time value can be utilized to retrieve a clothoid from memory. Specifically, a clothoid corresponding to 100 ms prior or any time between 50 ms and 2 seconds can be utilized. However, other distance/time values can be selected or predetermined based on an input.

At S418, a determination is made that an instantaneous offset jump has occurred when a calculated value is greater than a predetermined threshold. Predetermined thresholds for an instantaneous offset jump at S418 indicative of a lane merge may be may be bounded from below by an appropriate percentage of the lane width, which may be 20%, or bounded from below by an absolute value, which may be 50 cm depending on vehicle speed, clothoid parameter accuracy, and type of controller implementation. If the predetermined threshold for the instantaneous offset jump is satisfied, resulting in a "yes," then the process continues. Otherwise, if the comparison to the predetermined threshold is not satisfied at S418, resulting in a "no," then a lane merge is not detected, and the process is returned to S416 to compute a next instantaneous offset jump.

At S420, a lane merge is detected on the left side of the vehicle when the instantaneous offset jump is greater than the predetermined threshold at S418 and a lane split has not occurred. At S422, the right clothoid is selected for lane centering, which is the side of the vehicle that is opposite the side on which the lane merge occurred. The left clothoid information is disregarded. The vehicle is centered in the lane by calculating a lateral offset from the right clothoid, which can also be referred to as the vehicle offset. The vehicle offset may be calculated as half an average lane width's distance. An average lane width's distance may be computed online as a running average of previously identified lane widths or taken from offline information, such as a map or statistics.

At S424, the right clothoid is stored in memory so that it can be used to calculate the instantaneous off set jump at S426. At S426, the instantaneous offset jump is computed by calculating a difference in lateral position between the current right clothoid and a previous right clothoid stored in memory. Specifically, the clothoid stored in memory that is used for the instantaneous offset jump calculation may be configured by the user based on vehicle speed, clothoid parameter accuracy, and processing circuitry capabilities. According to one aspect, the clothoid retrieved from memory, which is selected for the instantaneous offset jump calculation, had been calculated for the vehicle's location 25 m in the past (i.e., at a time corresponding to when the vehicle was 25 m back from its current position).

At S428, a determination is made that an instantaneous offset jump has occurred when a calculated value is greater than a predetermined threshold. Predetermined thresholds for an instantaneous offset jump at S428 indicative of a lane merge may be may be bounded from below by an appropriate percentage of the lane width, which may be 20%, or bounded from below by an absolute value, which may be 50 cm depending on vehicle speed, clothoid parameter accuracy, and type of controller implementation. If the predetermined threshold for the instantaneous offset jump is satisfied, resulting in a "yes," then the process continues. Otherwise, if the comparison to the predetermined threshold is not satisfied at S428, resulting in a "no," then a lane merge is not detected, and the process is returned to S426 to compute the next instantaneous offset jump At S430, a lane merge is detected on the right side of the vehicle when the instantaneous offset jump is greater than the predetermined threshold at S428 and a lane split has not occurred. At S432, left clothoid is selected for lane centering, which is the side of the vehicle that is opposite the side on which the lane merge occurred. The right clothoid information is disregarded. The vehicle is centered in the lane by calculating a lateral offset from the left clothoid, which can also be referred to as the vehicle offset. The vehicle offset may be calculated as half an average lane width's distance. An average lane width's distance may be computed online as a running average of previously identified lane widths or taken from offline information, such as a map or statistics.

The above-discussed algorithms or portions thereof can be repeated or looped, as appropriate, to continuously, semi-continuously, or on-demand provide lane centering or the detection of, e.g., a lane split, ramp, or lane merge.

In FIGS. 5-6, the example illustrated therein are specific to driving on the right side of the road, where ramps are generally on the right side of the road. However, the teachings of this disclosure are not limited to such examples, as the teachings of this disclosure are also applicable to ramps on the left side of the road and to driving on the left side of the road. In these situations, the examples discussed below relating to FIGS. 5-6 can be considered in mirror (where left is replaced with right and vice versa).

Figure 5D:
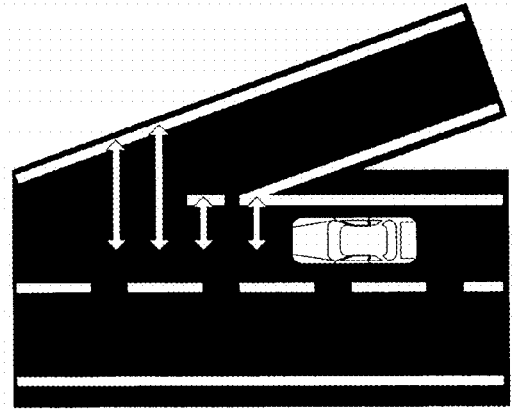
FIGS. 5C and 5D are exemplary illustrations of an instantaneous offset jump in the case of a lane merge or an on-ramp.
Figure 5C:
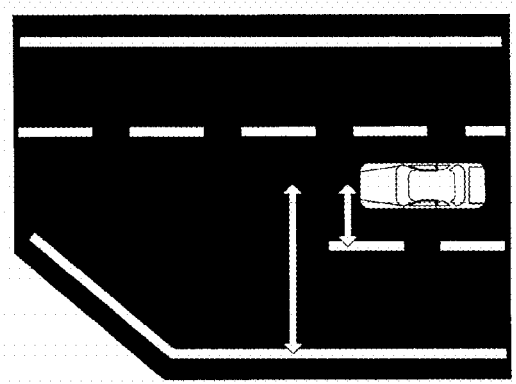
Figure 5B:
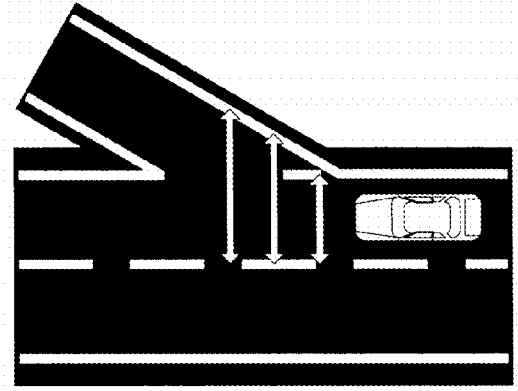
FIGS. 5A and 5B are exemplary illustrations of a lane width increase in the case of a lane split or an off-ramp.
Figure 5A:
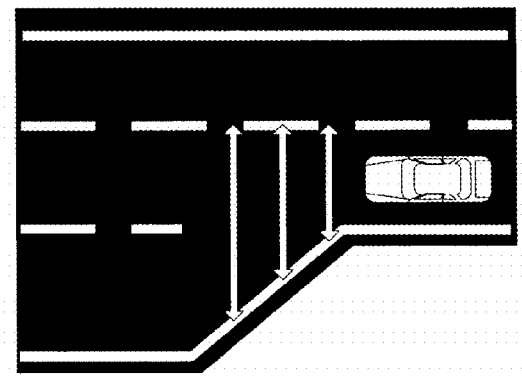

FIGS. 5A-5B illustrate exemplary lane width increases in the case of a lane split. FIG. 5A illustrates a lane split on the left side of the vehicle, and FIG. 5B illustrates an off-ramp on the right side of the vehicle. FIGS. 5A and 5B illustrate the increase in lane width ahead of the vehicle on the side of the vehicle on which the lane split or off-ramp occurred. In addition, the lane markers on the side of the vehicle with the lane split or off-ramp are solid lines, and the lane markers on the side of the vehicle opposite the lane split or off-ramp are dashed lines. In the implementation of FIG. 5B, in the case of an off-ramp on the right side of the vehicle, the solid line lane marker on the right side of the vehicle turns into a dashed line, and a solid line at the location of the lane split followed by a disappearance of the dashed line on the right side of the vehicle is detected. In this situation, the lane boundary on the right side of the vehicle that is detected is the solid line, after the disappearance of the dashed line, which leads to a calculated or gradual increase in lane width on the right side of the vehicle. The dashed line can also be detected in conjunction with the solid line, thereby indicating a lane split. Otherwise, the clothoid that is selected for lane centering in the case of a lane split or off-ramp is the side with the dashed line lane markers. In an implementation, the dashed line on the side of the lane split can continue through the lane split. In this situation, if the dashed line lane boundary is properly detected instead of the solid line at the location of the lane split, then single-sided lane centering would not be used, and the solid line lane boundary of the lane split or the off-ramp is ignored.

FIGS. 5C-5D illustrate exemplary instantaneous offset jumps in the case of a lane merge. FIG. 5C illustrates a lane merge occurring on the left side of the vehicle, and FIG. 5D illustrates an on-ramp occurring on the right side of the vehicle. FIGS. 5C and 5D illustrate an immediate increase in lateral distance from the vehicle of the clothoid on the side of the vehicle where the lane merge or on-ramp occurred. In the implementation of FIG. 5D, in the case of an on-ramp on the right side of the vehicle, the solid line lane marker on the right side of the vehicle turns into a dashed line and a solid line at the location of the lane merge followed by a disappearance of the dashed line on the right side of the vehicle. In this situation, the lane boundary on the right side of the vehicle that is detected is the solid line, which leads to an immediate increase in lateral distance from the vehicle of the clothoid on the right side of the vehicle.

Figure 6B:
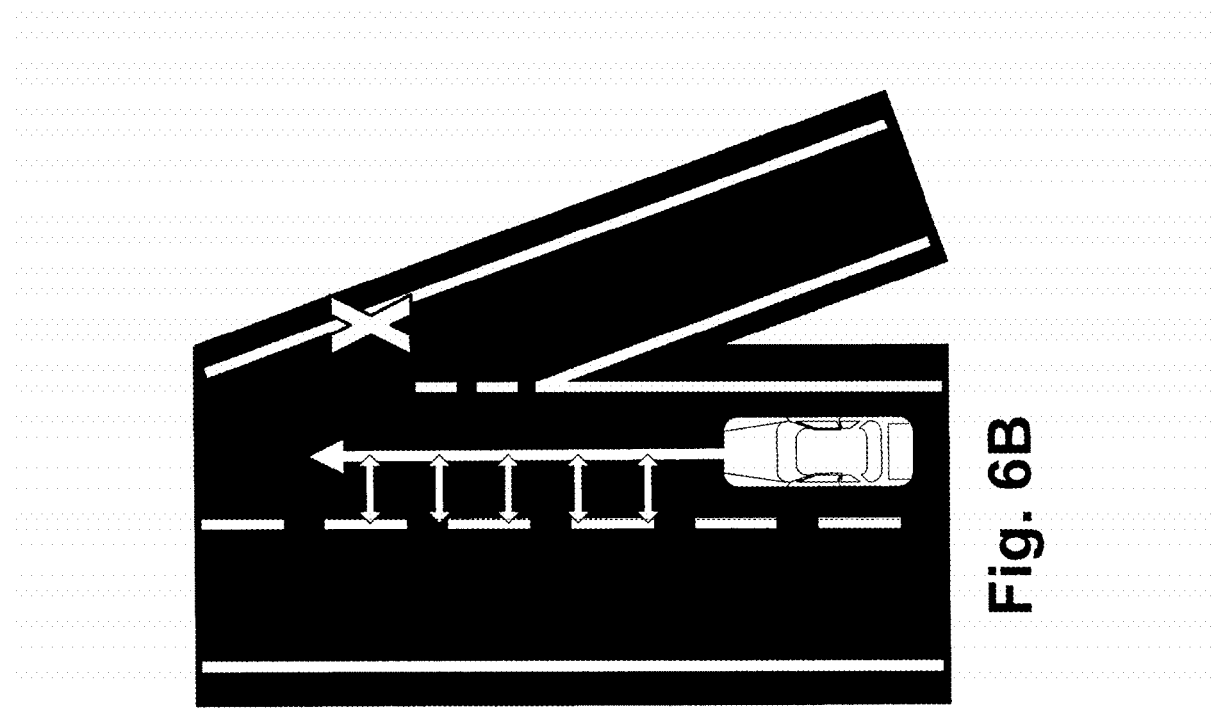
FIG. 6B is an exemplary illustration of the single-sided lane centering procedure in the case of a lane merge.
Figure 6A:
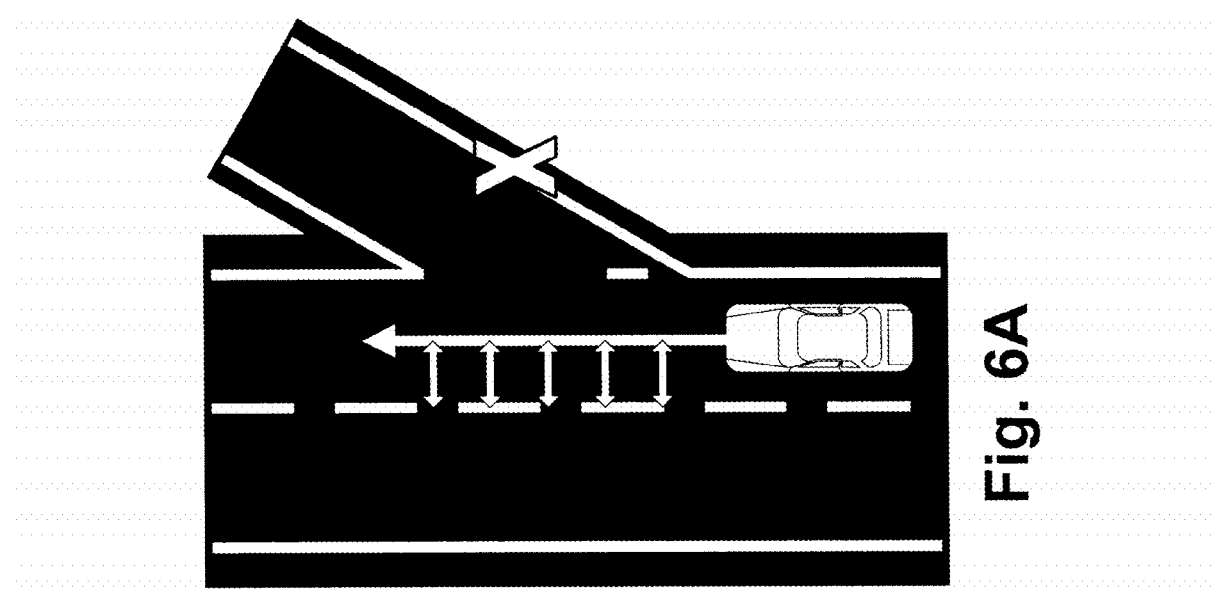
FIG. 6A is an exemplary illustration of the single-sided lane centering procedure in the case of a lane split.

FIG. 6A illustrates an exemplary single-sided lane centering procedure in the case of a lane split. In this example, the lane split occurs on the right side of the vehicle. The right clothoid information is ignored, and the left clothoid is used for lane centering. In addition, the lane center on which the vehicle travels is approximately equal to half an average lane width's distance from the left clothoid, which is referred to as the vehicle offset. The single-sided lane centering procedure may take effect after a predetermined number of consecutive clothoid samples detecting a lane split. According to one aspect, the number of consecutive clothoid samples is 2. The single-sided lane centering procedure may remain in effect for a predetermined distance of vehicle travel to ensure that the vehicle has passed the lane split. This distance of vehicle travel may be in the range of 1 m to 100 m but also including 5 m, 10 m, 25 m, 50 m, 75 m, 100 m, or more. In an implementation, this distance of vehicle travel may be 70 m.

FIG. 6B illustrates an exemplary single-sided lane centering procedure in the case of a lane merge. In this example, the lane merge occurs on the right side of the vehicle. The right clothoid information is ignored, and the left clothoid is used for lane centering. In addition, the lane center on which the vehicle travels is approximately equal to half an average lane width's distance from the left clothoid, which is referred to as the vehicle offset. The single-sided lane centering procedure may take effect after a predetermined number of consecutive clothoid samples detecting a lane merge. According to one aspect, the number of consecutive clothoid samples is 2. The single-sided lane centering procedure may remain in effect for a predetermined distance of vehicle travel to ensure that the vehicle has passed the lane merge. This distance of vehicle travel may be in the range of 1 m to 100 m but also including 5 m, 10 m, 25 m, 50 m, 75 m, 100 m, or more. In an implementation, this distance of vehicle travel may be 70 m.

Aspects of this disclosure relate to calculating the center of a lane in the presence of lane splits and lane merges, and these aspects may be applied to autonomous or semi-autonomous driving systems. In an exemplary driving system, a route for the vehicle to follow is loaded into a navigation system, either a priori or in real-time. Based on the vehicle's current route and the calculated lane center, the processing circuitry can output control signals that are transmitted to one or more actuators that control one or more actuated components of the vehicle. These actuated components can include one or more of steering controls, brakes, accelerators, turn signals, and/or a car horn. According to an implementation, the vehicle may need to move to another lane (e.g., a right-most lane from a center lane) to maintain its route. Control signals may be transmitted to an appropriate turn signal indicator, steering mechanism, and accelerator/decelerator to execute the lane shift and the vehicle can then be centered in its new lane via appropriate steering adjustments based on the algorithms discussed herein.

Blocks or circuits of computer architecture (i.e., circuitry) shown or described herein can be implemented in a single processing system, or distributed across a plurality of processing systems, which may be referred to as separate processors or circuits. For instance, each of the blocks of architecture can be a discrete processor, system, or logic component. Further, exemplary functions or features can be performed by common circuitry or by a general purpose processor executing specific instructions.

FIG. 7 illustrates an exemplary processing system (i.e., an exemplary processor or circuitry). One or more of such processing systems can be utilized in or to execute one or more algorithms, or portions thereof, or one or more architecture blocks, or portions thereof, in accordance with the descriptions provided herein. The system can be embodied and/or implemented as an electronic control unit (ECU) or a discrete computer installed in a vehicle.

The exemplary processing system can be implemented using one or more microprocessors or the equivalent, such as a central processing unit (CPU) and/or at least one application specific processor ASP (not shown). The microprocessor is circuitry that utilizes a computer readable storage medium, such as a memory circuit (e.g., ROM, EPROM, EEPROM, flash memory, static memory, DRAM, SDRAM, and their equivalents), configured to control the microprocessor to perform and/or control the processes and systems of this disclosure. Other storage mediums can be controlled via a controller, such as a disk controller, which can controls a hard disk drive or optical disk drive.

The microprocessor or aspects thereof, in alternate implementations, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit from parallel processing capabilities of a multi-cored CPU. Control circuitry provided by one or more processors in a multi-processing arrangement may also be employed to execute sequences of instructions contained in memory. Alternatively, hard-wired circuitry may be used in place of or in combination with software instructions. Thus, the exemplary implementations discussed herein are not limited to any specific combination of hardware circuitry and software.

In another aspect, results of processing in accordance with this disclosure can be displayed via a display controller to a monitor. The display controller preferably includes at least one graphic processing unit, which can be provided by a plurality of graphics processing cores, for improved computational efficiency. The display controller or portions thereof can also be incorporated into the CPU. Additionally, an I/O (input/output) interface is provided for inputting signals and/or data from a microphone, speakers, cameras, a mouse, a keyboard, a touch-based display or pad interface, etc., which can be connected to the I/O interface as a peripheral. For example, a keyboard or a pointing device for controlling parameters of the various processes or algorithms of this disclosure can be connected to the I/O interface to provide additional functionality and configuration options, or control display characteristics. Moreover, the monitor can be provided with a touch-sensitive or gesture-detecting interface for providing a command/instruction interface.

In an exemplary implementation, the I/O interface is provided for inputting sensor data from Sensors 1, 2 . . . N. The sensors are one or more vehicle-mounted cameras, which may include CMOS, CCD, or other digital cameras that obtain images of the surface of the road that contain lane feature data. The sensors can also include lidar, radar, and/or sonar. Other sensors that input data to the I/O interface may include velocity sensors, acceleration sensors, steering sensors, gyroscope sensors, and the like. The I/O interface can also provide an interface for outputting control signals to one or more actuators to control various actuated components, including steering, brake, accelerator, and throttle controllers of a vehicle.

The I/O interface can also be connected to a mobile device, such as a smartphone, a portable storage device, and/or a global position system (GPS) device or another positioning device. The I/O interface can include a Universal Serial Bus (USB) hub, Bluetooth circuitry, Near Field Communication (NFC) circuitry, or other wired or wireless communication circuits. In some aspects, the mobile device can provide sensor input, navigation input, and/or network access.

The above-noted components can be coupled to a network, such as the Internet or a local intranet, via a network interface for the transmission or reception of data, including controllable parameters. The network interface can include one or more IEEE 802 compliant circuits. A central BUS is provided to connect the above hardware components/circuits together and provides at least one path for digital communication there between.

The processing system may be a networked desktop computer, terminal, or personal device, such as a tablet computer or a mobile phone. The database discussed above may be stored remotely on a server, and the server may include components similar to or the same as the processing system. These devices may communicate via the network.

Suitable software, such as an operating system or an application, can be tangibly stored on a computer readable medium of a processing system, including the memory and storage devices. Other examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read. The software may include, but is not limited to, device drivers, operating systems, development tools, applications software, and/or a graphical user interface.

Computer code elements on the above-noted medium may be any interpretable or executable code mechanism, including but not limited to scripts, interpretable programs, dynamic link libraries (DLLs), Java classes, and complete executable programs. Moreover, parts of the processing of aspects of this disclosure may be distributed for better performance, reliability and/or cost.

The procedures and routines described herein can be embodied as a device, system, method, or computer program product, and can be executed via one or more dedicated circuits or programmed processors. Accordingly, the descriptions provided herein may take the form of exclusively hardware, exclusively software executed on hardware (including firmware, resident software, micro-code, etc.), or through a combination of dedicated hardware components and general processors that are configured by specific algorithms and process codes. Hardware components are referred to as a "circuit," "module," "unit," "device," or "system." Executable code that is executed by hardware is embodied on a tangible memory device, such as a computer program product. Examples include CDs, DVDs, flash drives, hard disk units, ROMs, RAMs, and other memory devices.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The invention claimed is:

1. An apparatus, comprising:
   circuitry configured to:
   process lane feature data to compute left and right lane clothoids;
   compute a look-ahead lane width and a near lane width based on the left and right lane clothoids;
   compute a lane width increase to detect a lane split or lane merge based on differences between the look-ahead and near lane widths;
   determine on which side of a vehicle the lane split or the lane merge occurred;
   perform a single-sided lane centering calculation based on the left clothoid or the right clothoid corresponding to the side of the vehicle on which the lane split or the lane merge did not occur; and
   center the vehicle in a lane by transmitting control signals to one or more actuators of the vehicle.

2. The apparatus of claim 1, wherein the circuitry is further configured to obtain the lane feature data from at least one image taken from one or more vehicle-mounted cameras.

3. The apparatus of claim 1, wherein the circuitry is further configured to determine the lane split is detected when the lane width increase is greater than a first threshold.

4. The apparatus of claim 3, wherein the circuitry is further configured to determine that the near lane width is the lane width at the vehicle's proximate location.

5. The apparatus of claim 4, wherein the circuitry is further configured to determine that the look-ahead lane width is the lane width further ahead of the vehicle than the near lane width.

6. The apparatus of claim 5, wherein the circuitry is further configured to compute an instantaneous offset jump to detect the lane merge based on differences between the left or right clothoid stored in memory and the current left or right clothoid.

7. The apparatus of claim 6, wherein the circuitry is further configured to determine that the lane merge is detected if the instantaneous offset jump is greater than a second threshold and no lane split is detected.

8. The apparatus of claim 7, wherein the circuitry is further configured to perform a verification of the lane split or the lane merge with stored map data.

9. The apparatus of claim 8, wherein the circuitry is further configured to ignore the left or right clothoid on the side of the vehicle where the lane split or merge occurred.

10. The apparatus of claim 9, wherein the circuitry is further configured to calculate a vehicle offset from the side of the vehicle opposite the side where the lane split or lane merge occurred.

11. The apparatus of claim 10, wherein the circuitry is further configured to begin performing the single-sided lane centering calculation a predetermined number of consecutive samples after the lane split or the lane merge is detected.

12. The apparatus of claim 11, wherein the circuitry is further configured to perform the single-sided lane centering calculation until the vehicle has traveled a predetermined distance.

13. The apparatus of claim 1, wherein the circuitry is further configured to determine the side on which the lane split or the lane merge occurred based on whether the vehicle is traveling in a "leftmost" lane, a "rightmost" lane, or an "other" lane.

14. The apparatus of claim 2, wherein the lane feature data includes lane marker information from the left and right sides of the vehicle.

15. The apparatus of claim 14, wherein the lane marker information includes one or more of position, curvature, curvature derivative, shape, color, and type of lane markers, and the circuitry is configured to compute the left and right clothoids based on the lane marker information.

16. The apparatus of claim 15, wherein the circuitry is further configured to compute the left and right clothoids that delineate one or more of the position, curvature, curvature derivative, and direction of left and right boundaries of the lane in which the vehicle is traveling.

17. The apparatus of claim 1, wherein the circuitry is further configured to:
   obtain a current position of the vehicle;
   correlate the current position of the vehicle in stored map data; and
   detect the lane splits and the lane merges based on the stored map data when the current position of the vehicle is determined to be accurate within a predetermined tolerance.

18. A method, comprising:
   processing lane feature data to compute left and right lane clothoids;
   computing a look-ahead lane width and a near lane width based on the left and right lane clothoids;
   computing a lane width increase to detect a lane split or lane merge based on differences between the look-ahead and near lane widths;
   determining on which side of a vehicle the lane split or the lane merge occurred;
   performing a single-sided lane centering calculation based on the left clothoid or the right clothoid corresponding to the side of the vehicle on which the lane split or lane merge did not occur; and centering the vehicle in a lane by transmitting control signals to one or more actuators of the vehicle.

19. A non-transitory computer-readable storage medium including executable instructions, which when executed by circuitry, causes the circuitry to perform the method according to claim 18.

20. A system, comprising:
one or more sensors to obtain lane feature data; and
a controller including a processor configured to:
  process the lane feature data to compute left and right lane clothoids;
  compute a look-ahead lane width and a near lane width based on the left and right lane clothoids;
  compute a lane width increase to detect a lane split or lane merge based on differences between the look-ahead and near lane widths;
  determine on which side of a vehicle the lane split or the lane merge occurred;
  perform a single-sided lane centering calculation based on the left clothoid or the right clothoid corresponding to the side of the vehicle on which the lane split or the lane merge did not occur; and
  center the vehicle in a lane by transmitting control signals to one or more actuators of the vehicle.

* * * * *